(12) United States Patent
Park et al.

(10) Patent No.: US 11,189,071 B2
(45) Date of Patent: Nov. 30, 2021

(54) ELECTRONIC DEVICE FOR PROVIDING AVATAR ANIMATION AND METHOD THEREOF

(71) Applicant: SAMSUNG ELECTRONICS CO., LTD., Suwon-si (KR)

(72) Inventors: Jongpil Park, Suwon-si (KR); Yunhyeong Kim, Suwon-si (KR); Jaeeun Yang, Suwon-si (KR); Kihwan Choi, Suwon-si (KR); Chanmin Park, Suwon-si (KR); Jungeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/778,118

(22) Filed: Jan. 31, 2020

(65) Prior Publication Data

US 2020/0258280 A1    Aug. 13, 2020

(30) Foreign Application Priority Data

Feb. 7, 2019    (KR) .................. 10-2019-0014300

(51) Int. Cl.
| | | |
|---|---|---|
| *G06T 13/40* | (2011.01) | |
| *G06T 1/60* | (2006.01) | |
| *G06F 3/01* | (2006.01) | |
| *G06F 3/041* | (2006.01) | |

(52) U.S. Cl.
CPC ............. *G06T 13/40* (2013.01); *G06F 3/011* (2013.01); *G06F 3/017* (2013.01); *G06T 1/60* (2013.01); *G06F 3/041* (2013.01); *G06T 2213/12* (2013.01)

(58) Field of Classification Search
CPC ....... G06T 13/40; G06T 1/60; G06T 2213/12; G06T 1/20; G06F 3/017; G06F 3/011; G06F 3/041
See application file for complete search history.

(56) References Cited

U.S. PATENT DOCUMENTS 9,761,032 B2    9/2017   Tong et al.
9,799,133 B2   10/2017   Tong et al.
9,939,887 B2    4/2018   Borke et al.
(Continued)

FOREIGN PATENT DOCUMENTS

JP    2000-163178    6/2000
KR   10-2010-0121420  11/2010

OTHER PUBLICATIONS

International Search Report and Written Opinion dated May 18, 2020 in counterpart International Patent Application No. PCT/KR2020/001425.

*Primary Examiner* — Mark W Regn
(74) *Attorney, Agent, or Firm* — Nixon & Vanderhye P.C.

(57) ABSTRACT

An electronic device includes a display, at least one sensor, a processor operatively connected to the display and the at least one sensor, and a memory operatively connected to the processor. The memory stores instructions that, when executed, cause the processor to control the electronic device to obtain a first input associated with generation of a first avatar animation, to obtain first data for a first object based on the obtained first input, to obtain second data for a second object based on the obtained first input and a specified scheme, to generate the first avatar animation based on the first data and the second data, and to display the first avatar animation.

18 Claims, 11 Drawing Sheets

(56) References Cited

U.S. PATENT DOCUMENTS

| | | | |
|---|---|---|---|
| 10,379,719 B2 | 8/2019 | Scapel et al. | |
| 10,438,393 B2 | 10/2019 | Grant | |
| 10,521,091 B2 | 12/2019 | Anzures et al. | |
| 10,540,800 B2 | 1/2020 | Tong et al. | |
| 2013/0038601 A1 | 2/2013 | Han et al. | |
| 2016/0267699 A1 | 9/2016 | Borke et al. | |
| 2016/0328874 A1 | 11/2016 | Tong et al. | |
| 2018/0204368 A1 | 7/2018 | Tong et al. | |
| 2018/0260521 A1 | 9/2018 | Kim | |
| 2018/0268589 A1* | 9/2018 | Grant | G06T 13/40 |
| 2018/0335927 A1 | 11/2018 | Anzures et al. | |
| 2018/0335929 A1 | 11/2018 | Scapel et al. | |
| 2018/0336716 A1 | 11/2018 | Ramprashad et al. | |
| 2019/0392627 A1 | 12/2019 | Grant | |

* cited by examiner

ELECTRONIC DEVICE FOR PROVIDING AVATAR ANIMATION AND METHOD THEREOF

CROSS-REFERENCE TO RELATED APPLICATION

This application is based on and claims priority under 35 U.S.C. § 119 to Korean Patent Application No. 10-2019-0014300, filed on Feb. 7, 2019, in the Korean Intellectual Property Office, the disclosure of which is incorporated by reference herein its entirety.

BACKGROUND

1. Field

The disclosure relates to an electronic device for providing avatar animation and a method thereof.

2. Description of Related Art

An electronic device may provide an environment in which a user is capable of employing a personalized character in augmented reality (AR) or virtual reality (VR). For example, the electronic device may provide the user's intent or emotion through avatar animation indicating facial expressions or gestures in real time.

An electronic device may obtain the image of an external object (e.g., a user) through a camera or may obtain a user input through a motion sensor or a touch sensor, to generate avatar animation. For example, the electronic device may generate the avatar animation in real time by tracking the external object through the camera or may provide the pre-stored data (e.g., an avatar template) depending on the obtained user input.

When the electronic device tracks the external object through the camera, the quality of the avatar animation may be degraded depending on the performance of the camera. For example, in the case of a portable electronic device including a camera having the limited size such as a smartphone, the generation speed or accuracy of the animation for a portion (e.g. a hair, a finger, or an accessory), on which the tracking is not easily performed, in the external object may be reduced. Furthermore, when the partial portion of the external object is out of the camera's shooting range, an unnatural avatar animation may be generated due to the error of the tracking.

When the electronic device provides the avatar animation using the pre-stored avatar template, because the storage space in a memory may be reduced as the number of avatar templates increases, the types of avatar animations may be limited. Furthermore, the avatar template indicates avatar animation in the shape in which portions of the external object are already assembled, and thus the electronic device may not individually reflect the movement of each of the portions of the external object.

The above information is presented as background information only to assist with an understanding of the disclosure. No determination has been made, and no assertion is made, as to whether any of the above might be applicable as prior art with regard to the disclosure.

SUMMARY

Embodiments of the disclosure address at least the above-mentioned problems and/or disadvantages and to provide at least the advantages described below. Accordingly, an example aspect of the disclosure is to provide an electronic device and a method that more precisely or variously generate avatar animation.

In accordance with an example aspect of the disclosure, an electronic device may include a display, at least one sensor, a processor operatively connected to the display and the at least one sensor, and a memory operatively connected to the processor. The memory may store instructions that, when executed, cause the processor to control the electronic device to: obtain a first input associated with generation of a first avatar animation through the at least one sensor, obtain first data for a first object based on the obtained first input, obtain second data for a second object based on the obtained first input and a specified scheme, generate the first avatar animation based on the first data and the second data, and display the first avatar animation through the display. The first avatar animation may include a first object and a second object indicating a location different from the first object.

In accordance with another example aspect of the disclosure, a method of an electronic device may include obtaining a first input associated with generation of a first avatar animation, obtaining first data for a first object based on the obtained first input, obtaining second data for a second object based on the obtained first input and a specified scheme, generating the first avatar animation based on the first data and the second data, and displaying the first avatar animation through a display. The first avatar animation may include a first object and a second object indicating a location different from the first object.

In accordance with another example aspect of the disclosure, an electronic device may include a display, at least one sensor, a processor operatively connected to the display and the at least one sensor, and a memory operatively connected to the processor. The memory may store instructions that, when executed, cause the processor to control the electronic device to: obtain a first input associated with generation of a first avatar animation through the at least one sensor, identify whether a first object included in the first avatar animation satisfies a specified condition, generate first data for the first object based on the first input based on the first object not satisfying the specified condition or obtain second data for the object based on the first input and a specified scheme based on the first object satisfying the specified condition, generate the first avatar animation based on the first data or the second data, and display the first avatar animation through the display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

Hereinafter, various example embodiments of the disclosure may be described with reference to accompanying drawings. Accordingly, those of ordinary skill in the art will recognize that various modifications, equivalents, and/or alternatives on the various example embodiments described herein may be variously made without departing from the scope and spirit of the disclosure.

Figure 1:
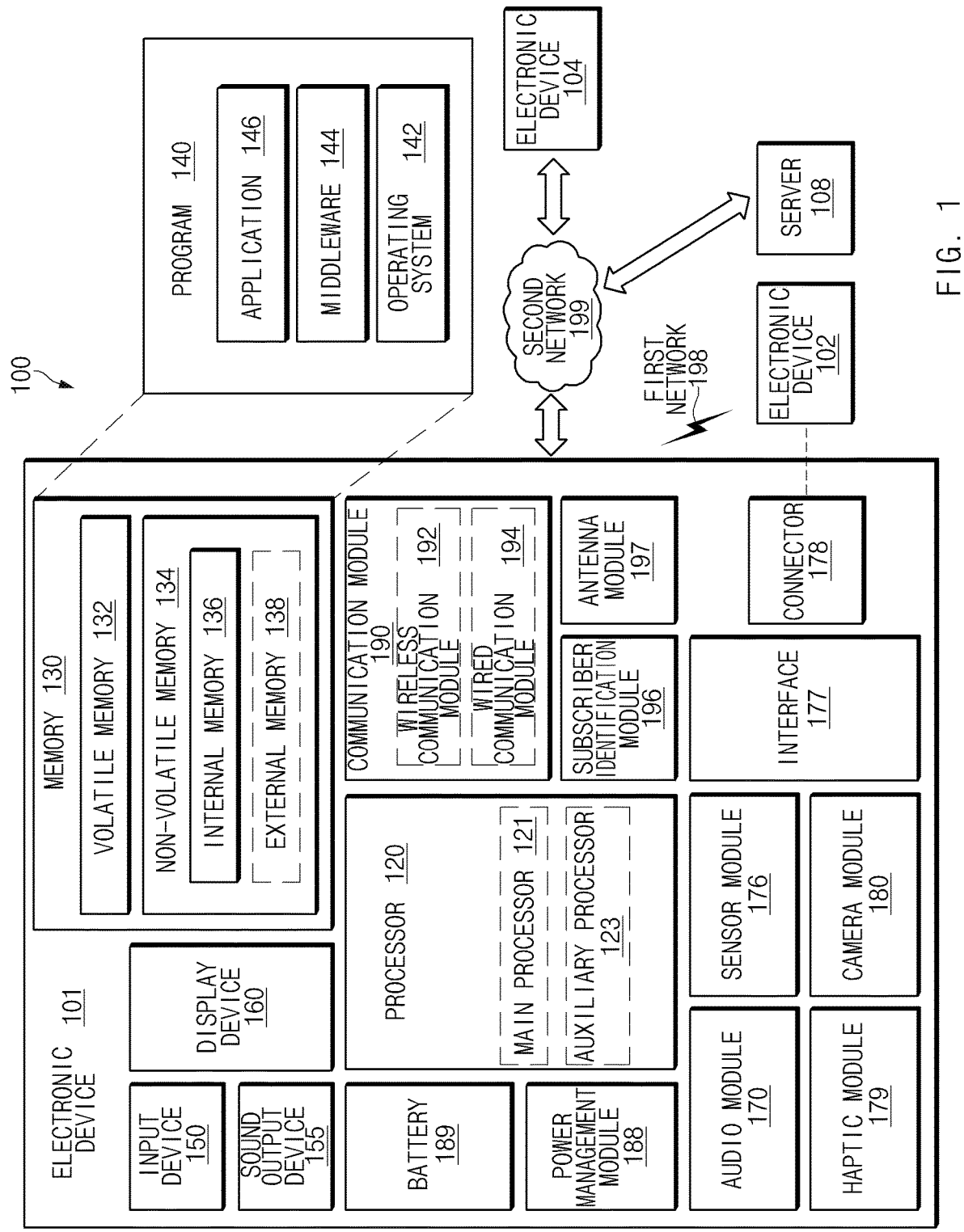
FIG. 1 is a block diagram illustrating an example electronic device in a network environment according to various embodiments.

FIG. 1 is a block diagram illustrating an example electronic device 101 in a network environment 100, according to various embodiments.

Referring to FIG. 1, an electronic device 101 may communicate with an electronic device 102 through a first network 198 (e.g., a short-range wireless communication network) or may communicate with an electronic device 104 or a server 108 through a second network 199 (e.g., a long-distance wireless communication network) in a network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. According to some embodiments, at least one (e.g., the display device 160 or the camera module 180) among components of the electronic device 101 may be omitted or one or more other components may be added to the electronic device 101. According to some embodiments, some of the above components may be implemented with one integrated circuit. For example, the sensor module 176 (e.g., a fingerprint sensor, an iris sensor, or an illuminance sensor) may be embedded in the display device 160 (e.g., a display).

The processor 120 may execute, for example, software (e.g., a program 140) to control at least one of other components (e.g., a hardware or software component) of the electronic device 101 connected to the processor 120 and may process or compute a variety of data. According to an embodiment, as a part of data processing or operation, the processor 120 may load a command set or data, which is received from other components (e.g., the sensor module 176 or the communication module 190), into a volatile memory 132, may process the command or data loaded into the volatile memory 132, and may store result data into a nonvolatile memory 134. According to an embodiment, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121 or with the main processor 121. Additionally or alternatively, the auxiliary processor 123 may use less power than the main processor 121, or is specified to a designated function. The auxiliary processor 123 may be implemented separately from the main processor 121 or as a part thereof.

The auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to an embodiment, the auxiliary processor 123 (e.g., the image signal processor or the communication processor) may be implemented as a part of another component (e.g., the camera module 180 or the communication module 190) that is functionally related to the auxiliary processor 123.

The memory 130 may store a variety of data used by at least one component (e.g., the processor 120 or the sensor module 176) of the electronic device 101. For example, data may include software (e.g., the program 140) and input data or output data with respect to commands associated with the software. The memory 130 may include the volatile memory 132 or the nonvolatile memory 134.

The program 140 may be stored in the memory 130 as software and may include, for example, an operating system 142, a middleware 144, or an application 146.

The input device 150 may receive a command or data, which is used for a component (e.g., the processor 120) of the electronic device 101, from an outside (e.g., a user) of the electronic device 101. The input device 150 may include, for example, a microphone, a mouse, a keyboard, or a digital pen (e.g., a stylus pen).

The sound output device 155 may output a sound signal to the outside of the electronic device 101. The sound output device 155 may include, for example, a speaker or a receiver. The speaker may be used for general purposes, such as multimedia play or recordings play, and the receiver may be used for receiving calls. According to an embodiment, the receiver and the speaker may be either integrally or separately implemented.

The display device 160 may visually provide information to the outside (e.g., the user) of the electronic device 101. For example, the display device 160 may include a display, a hologram device, or a projector and a control circuit for controlling a corresponding device. According to an embodiment, the display device 160 may include a touch circuitry configured to sense the touch or a sensor circuit (e.g., a pressure sensor) for measuring an intensity of pressure on the touch.

The audio module 170 may convert a sound and an electrical signal in dual directions. According to an embodiment, the audio module 170 may obtain the sound through the input device 150 or may output the sound through the sound output device 155 or an external electronic device (e.g., the electronic device 102 (e.g., a speaker or a headphone)) directly or wirelessly connected to the electronic device 101.

The sensor module 176 may generate an electrical signal or a data value corresponding to an operating state (e.g., power or temperature) inside or an environmental state (e.g., a user state) outside the electronic device 101. According to an embodiment, the sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support one or more designated protocols to allow the electronic device 101 to connect directly or wirelessly to the external electronic device (e.g., the electronic device 102). According to an embodiment, the interface 177 may include, for example, an HDMI (high-definition multimedia interface), a USB (universal serial bus) interface, an SD card interface, or an audio interface.

A connecting terminal 178 may include a connector that physically connects the electronic device 101 to the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. According to an embodiment, the haptic module 179 may include, for example, a motor, a piezoelectric element, or an electric stimulator.

The camera module 180 may shoot a still image or a video image. According to an embodiment, the camera module 180 may include, for example, at least one or more lenses, image sensors, image signal processors, or flashes.

The power management module 188 may manage power supplied to the electronic device 101. According to an embodiment, the power management module 188 may be implemented as at least a part of a power management integrated circuit (PMIC).

The battery 189 may supply power to at least one component of the electronic device 101. According to an embodiment, the battery 189 may include, for example, a non-rechargeable (primary) battery, a rechargeable (secondary) battery, or a fuel cell.

The communication module 190 may establish a direct (e.g., wired) or wireless communication channel between the electronic device 101 and the external electronic device (e.g., the electronic device 102, the electronic device 104, or the server 108) and support communication execution through the established communication channel. The communication module 190 may include at least one communication processor operating independently from the processor 120 (e.g., the application processor) and supporting the direct (e.g., wired) communication or the wireless communication. According to an embodiment, the communication module 190 may include a wireless communication module 192 (e.g., a cellular communication module, a short-range wireless communication module, or a GNSS (global navigation satellite system) communication module) or a wired communication module 194 (e.g., an LAN (local area network) communication module or a power line communication module). The corresponding communication module among the above communication modules may communicate with the external electronic device through the first network 198 (e.g., the short-range communication network such as a Bluetooth, a Wi-Fi direct, or an IrDA (infrared data association)) or the second network 199 (e.g., the long-distance wireless communication network such as a cellular network, an internet, or a computer network (e.g., LAN or WAN)). The above-mentioned various communication modules may be implemented into one component (e.g., a single chip) or into separate components (e.g., chips), respectively. The wireless communication module 192 may identify and authenticate the electronic device 101 using user information (e.g., international mobile subscriber identity (IMSI)) stored in the subscriber identification module 196 in the communication network, such as the first network 198 or the second network 199.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some components among the components may be connected to each other through a communication method (e.g., a bus, a GPIO (general purpose input and output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 101 and the external electronic device 104 through the server 108 connected to the second network 199. Each of the electronic devices 102 and 104 may be the same or different types as or from the electronic device 101. According to an embodiment, all or some of the operations performed by the electronic device 101 may be performed by one or more external electronic devices among the external electronic devices 102, 104, or 108. For example, when the electronic device 101 performs some functions or services automatically or by request from a user or another device, the electronic device 101 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 101. The electronic device 101 may provide the result as is or after additional processing as at least a part of the response to the request. To this end, for example, a cloud computing, distributed computing, or client-server computing technology may be used.

Figure 2:
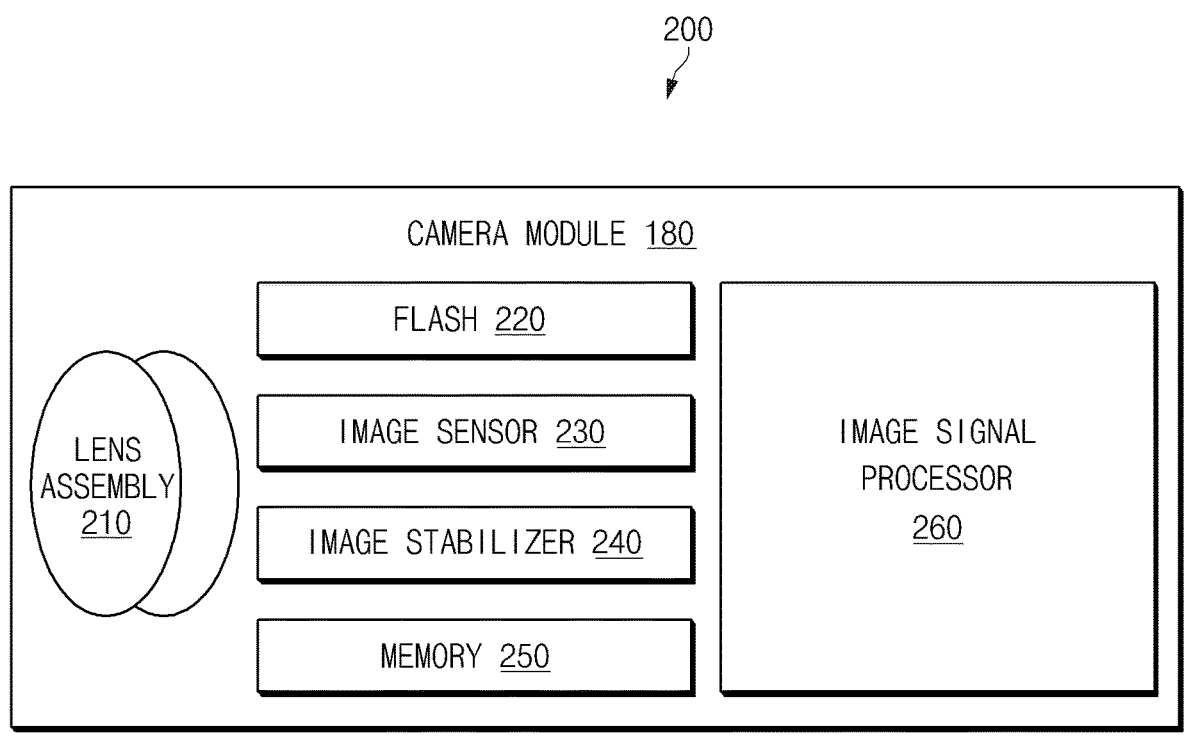
FIG. 2 is a block diagram illustrating an example camera module according to various embodiments.

FIG. 2 is a block diagram 200 illustrating an example camera module 180, according to various embodiments. Referring to FIG. 2, a camera module 180 may include a lens assembly 210, a flash 220, an image sensor 230, an image stabilizer 240, a memory 250 (e.g., a buffer memory), or an image signal processor 260. The lens assembly 210 may collect the light emitted from the subject to be captured. The lens assembly 210 may include one or more lenses. According to an embodiment, the camera module 180 may include the plurality of lens assemblies 210. In this case, the camera module 180 may be implemented with, for example, a dual camera, a 360-degree camera, or a spherical camera. The part of the plurality of lens assemblies 210 may have the same lens attribute (e.g., a field of view, a focal length, an auto focus, f-number, or an optical zoom); alternatively, at least one lens assembly may have one or more lens attributes different from the lens attributes of another lens assembly. For example, the lens assembly 210 may include a wide-angle lens or a telephoto lens.

The flash 220 may emit light used to enhance the light emitted or reflected from the subject. According to an embodiment, the flash 220 may include one or more light emitting diodes (e.g., a red-green-blue (RGB) LED, a white LED, an infrared LED, or an ultraviolet LED) or a xenon lamp. The image sensor 230 may obtain an image corresponding to the subject by converting light, which is emitted or reflected from the subject and then is transmitted through the lens assembly 210, into an electrical signal. According to an embodiment, for example, the image sensor 230 may include a single image sensor, which is selected among image sensors having different attributes, such as an RGB sensor, a black and white (BW) sensor, an IR sensor, or a UV sensor, a plurality of image sensors having the same attribute, or a plurality of image sensors having different attributes. For example, each image sensor included in the image sensor 230 may be implemented using a charged coupled device (CCD) sensor or a complementary metal oxide semiconductor (CMOS) sensor.

The image stabilizer 240 may move at least one lens included in the lens assembly 210 or the image sensor 230 in a specific direction or may control (e.g., adjusting read-out timing, or the like) the operating characteristics of the image sensor 230, in response to the motion of the camera module 180 or the electronic device 101 including the camera module 180. This makes it possible to compensate for at least part of the negative effects by the movement on the captured image. According to an embodiment, the image stabilizer 240 may detect such the movement of the camera module 180 or the electronic device 101, using a gyro sensor (not illustrated) or an acceleration sensor (not illustrated) disposed inside or outside the camera module 180. According to an embodiment, for example, the image stabilizer 240 may be implemented with an optical image stabilizer. The memory 250 may at least temporarily store at least part of the image obtained through the image sensor 230 for the next image processing task. For example, when image acquisition according to a shutter is delayed or when a plurality of images are obtained at high speed, the obtained original image (e.g., a Bayer-patterned image or an image of high resolution) may be stored in the memory 250 and the copy image (e.g., an image of low resolution) corresponding to the obtained original image may be previewed through the display device 160. Afterward, when a specified condition is satisfied (e.g., a user input or a system command), at least part of the original image stored in the memory 250 may be obtained and processed by, for example, the image signal processor 260. According to an embodiment, the memory 250 may be implemented with at least part of the memory 130 or a separate memory operating independently of the memory 130.

The image signal processor 260 may perform one or more pieces of image processing on the image obtained through the image sensor 230 or the image stored in the memory 250. For example, the one or more pieces of image processing may include the generation of a depth map, three-dimensional modeling, panorama generation, feature point extraction, image compositing, or image compensation (e.g., noise reduction, resolution adjustment, brightness adjustment, blurring, sharpening, or softening). Additionally or alternatively, the image signal processor 260 may control (e.g., exposure time control, or read-out timing control, or the like) of at least one (e.g., the image sensor 230) of the components included in the camera module 180. The image processed by the image signal processor 260 may be stored again in the memory 250 for further processing or may be provided to an external component of the camera module 180 (e.g., the memory 130, the display device 160, the electronic device 102, the electronic device 104, or the server 108). According to an embodiment, the image signal processor 260 may be implemented with at least part of the processor 120 or may be implemented with a separate processor operating independently of the processor 120. When the image signal processor 260 is implemented with a processor separate from the processor 120, the at least one image processed by the image signal processor 260 may be displayed by the processor 120 through the display device 160 as it is or after further image processing.

According to an embodiment, the electronic device 101 may include a plurality of camera modules 180 having different attributes or functions. In this case, for example, at least one of the plurality of camera modules 180 may be a wide-angle camera, and at least the other may be a telephoto camera. Similarly, at least one of the plurality of camera modules 180 may be a front camera, and at least the other may be a rear camera.

FIGS. 3A, 3B and 3C are diagrams illustrating an example operation of the electronic device 101 generating an avatar animation 300, according to various embodiments.

Referring to FIGS. 3A, 3B and 3C, the electronic device 101 may generate the avatar animation 300 moving in the order of FIG. 3A, FIG. 3B, and FIG. 3C. The avatar animation may include, for example, and without limitation, an animated image (e.g., -mp4, avi, or gif) indicating that an avatar (e.g., 310) moves in an AR or VR environment. For example, the electronic device 101 may generate the avatar animation 300 by composing a plurality of frames (or images). The frame may include data (which may be referred to as "animation data") indicating an operation of the avatar 310 at a specific point in time (or instance). In this case, each of FIG. 3A, FIG. 3B, and FIG. 3C may indicate a single frame.

Figure 3:
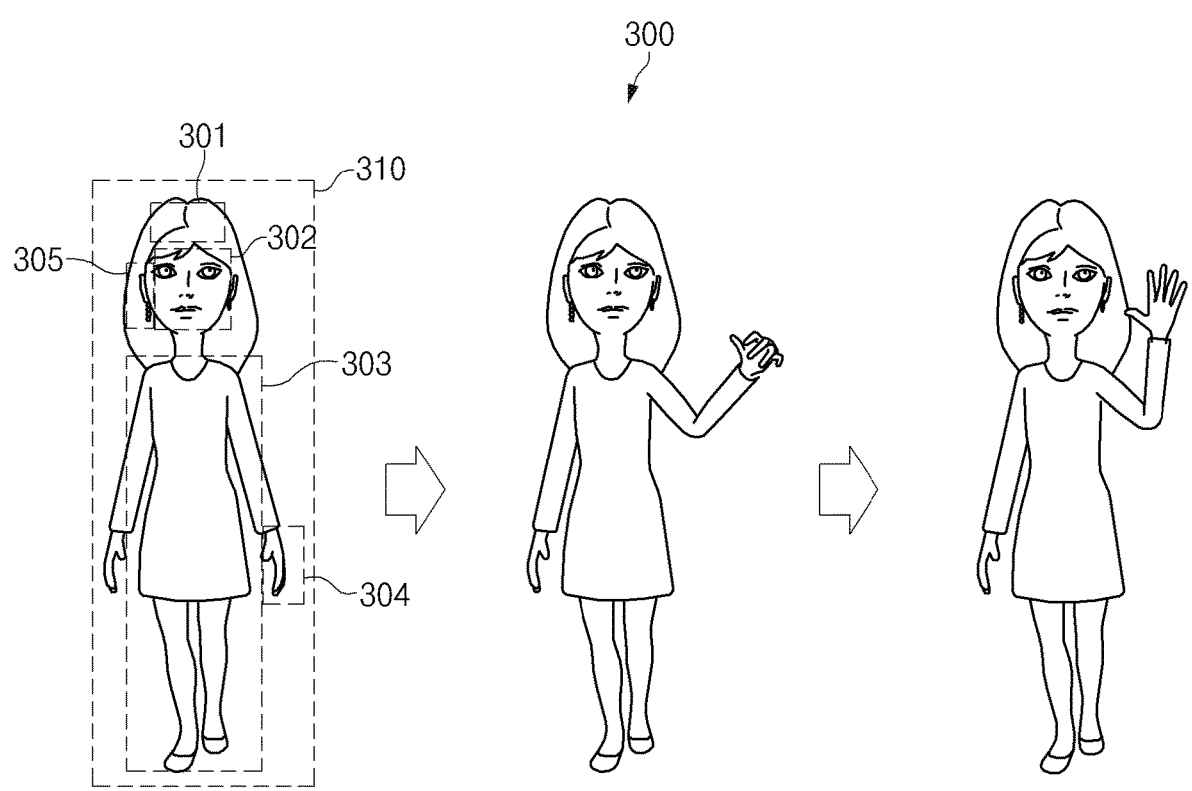
FIGS. 3A, 3B and 3C are diagrams illustrating an example operation of an electronic device generating avatar animation, according to various embodiments.

FIGS. 3A, 3B and 3C illustrate the avatar animation 300 including three frames. However, the number or the frame rate of frames forming the avatar animation 300 is not limited to the example illustrated in FIG. 3. For example, the frame rate of frames forming the avatar animation 300 may be the same as or similar to the frame rate of the image, which is supported by the display (e.g., at least part of the display device 160 of FIG. 1) of the electronic device 101 or is rendered by the display. In this case, the electronic device 101 may insert other frames (or images) between the frames indicated by FIG. 3A, FIG. 3B, and FIG. 3C such that the movement of the avatar 310 appears continuously.

Referring to FIG. 3A, the avatar 310 may include a plurality of objects 301, 302, 303, 304, and 305. For example, the object may include, for example, and without limitation, a body portion (e.g., a hair, a face, an upper body, a lower body, a foot, or a hand), a costume, an accessory, or the like. An embodiment illustrated by way of example in FIG. 3A as the avatar 310 including the hair 301, the face 302, the body 303, the hand 304, and the accessory 305. However, the type or the number of objects included in the avatar 310 is not limited to the example illustrated in FIG. 3A.

When the electronic device 101 generates the avatar animation (e.g., 300) based on the image input or the user input, which is obtained through at least one sensor (e.g., a camera, a motion sensor, or a touch sensor), the quality of the avatar animation may be degraded depending on the performance of at least one sensor. For example, the generation speed or the generation accuracy of the animation for an object (e.g., the hair 301, the hand 304, or the accessory 305), on which the tracking is not easily performed, may decrease; when some objects are out of the shooting range of the camera, an unnatural avatar animation may be generated due to the error of the tracking.

According to an embodiment, the electronic device 101 may apply different data generation methods to the plurality of objects 301, 302, 303, 304, and 305. For example, the electronic device 101 may generate animation data for some objects (e.g., the face 320 or the body 303) based on at least one of an image input or a user input and may generate animation data for some other objects (e.g., the hair 301, the hand 304, or the accessory 305) based on the specified scheme. The specified scheme may include, for example, and without limitation, at least one of a rule-based animation generation scheme, a physically-based animation generation scheme, a machine learning-based animation generation scheme, a constraint-based animation generation scheme, or the like.

For example, when the tracking for the hand 304 is not easy, the electronic device 101 may generate animation data for other portions (e.g., the hair 301, the face 302, the body 303, and the accessory 305) based on tracking and may generate animation data for the hand 304 based on the machine learning-based animation generation scheme. For example, in the case where bending and spreading out the user's finger when the user raises his/her arm is learned by the electronic device 101 (or an external server), the electronic device 101 may generate animation data indicating an operation of bending and spreading out the user's finger, based on the user input to raise the arm.

Through the above-described method, the electronic device 101 may generate the avatar animation indicating various operations while reducing the usage space of the memory (e.g., 130 of FIG. 1). Furthermore, the electronic device 101 may generate the precise and natural avatar animation.

Figure 4:
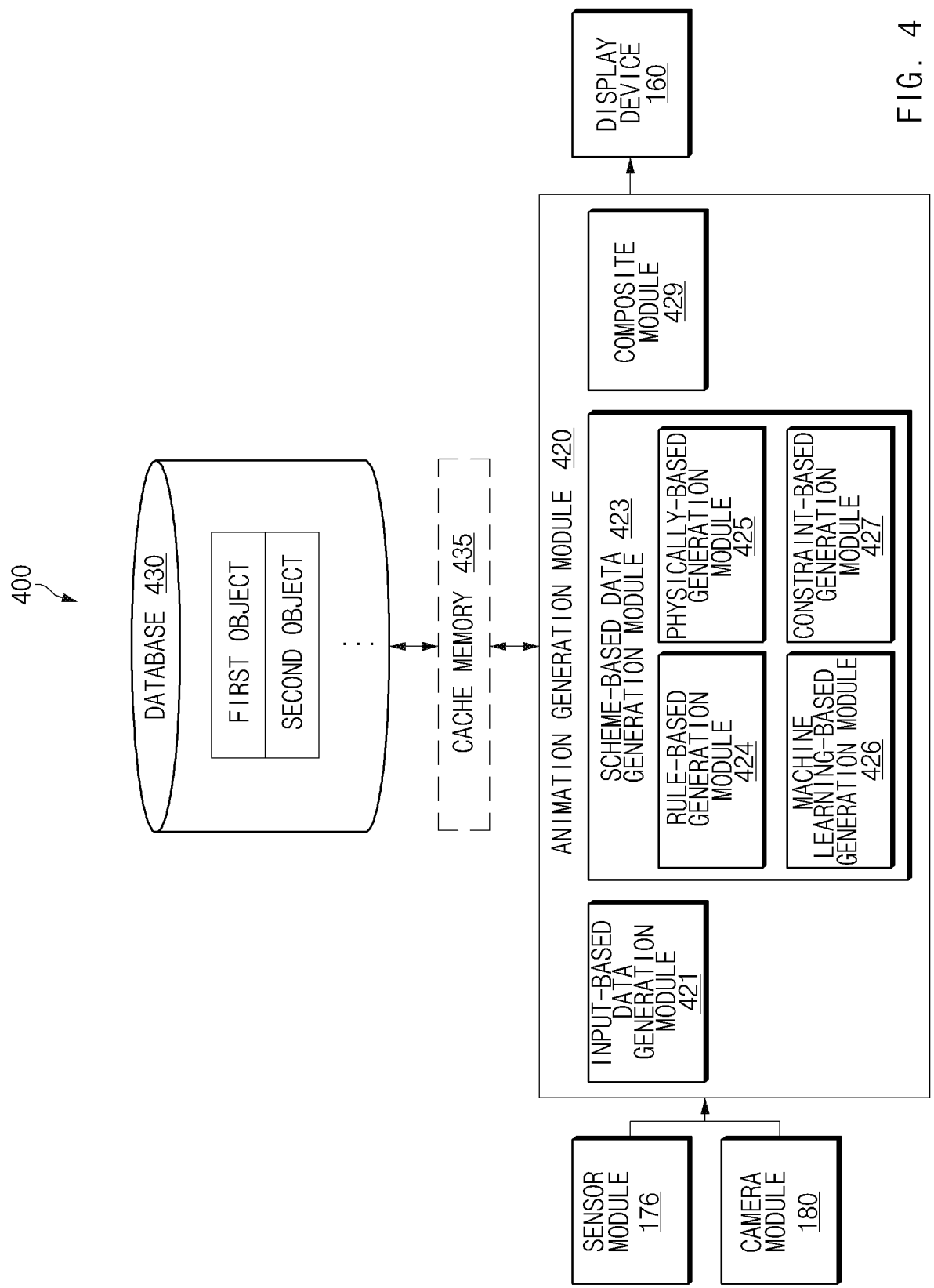
FIG. 4 is a block diagram illustrating an example electronic device for generating avatar animation, according to various embodiments.

FIG. 4 is a block diagram 400 illustrating an example electronic device for generating avatar animation, according to various embodiments.

Referring to FIG. 4, the electronic device may include at least one sensor (e.g., the sensor module 176 or a camera module 180), an animation generation module (e.g., including animation generation circuitry) 420, a database 430, and a display device 160. The parts overlapping with the description of FIG. 1 may be omitted in the description of the sensor module 176, the camera module 180, and the display device 160.

According to an embodiment, the sensor module 176 may include various sensors including sensor circuitry and be configured to obtain a user input. For example, the sensor module 176 may detect at least one of a gesture input, a touch input, and motion through, for example, and without limitation, at least one of a gesture sensor, a touch sensor, a gyro sensor, or an acceleration sensor, and may generate a parameter (e.g., motion data) corresponding to the detected input.

According to an embodiment, the camera module 180 may include various camera circuitry and components and be configured to obtain an image input. For example, the camera module 180 may capture an image through at least one of a red green blue (RGB) camera or a depth camera and may obtain the motion data from the captured image.

According to an embodiment, the animation generation module 420 may include various animation generation circuitry and be configured to generate avatar animation (e.g., 300 of FIG. 3). The animation generation module 420 may include various processing circuitry and/or executable program elements, including, for example, a hardware module or a set of instructions stored in a memory (e.g., 130 of FIG. 1) such as an application (e.g., 146 of FIG. 1). According to an embodiment, a processor (e.g., 120 of FIG. 1) of the electronic device 101 may include various processing circuitry and perform the overall function of the electronic device 101 for generating the avatar animation by executing the animation generation module 420. The animation generation module 420 may include an input-based data generation module (e.g., including various processing circuitry and/or executable program elements) 421, a scheme-based data generation module (e.g., including various processing circuitry and/or executable program elements) 423, and a composite module (e.g., including various processing circuitry and/or executable program elements) 429.

According to an embodiment, the input-based data generation module 421 may include various processing circuitry and/or executable program elements and generate animation data for at least one object based on data (e.g., motion data) generated from the sensor module 176 or the camera module 180 and the animation data pre-stored in the database 430.

According to an embodiment, the scheme-based data generation module 423 may include various processing circuitry and/or executable program elements and generate the animation data for at least one object satisfying a specified condition, based on the specified scheme. The object satisfying the specified condition may refer, for example, to an object having the bad (e.g., low) quality of the animation data generated by the sensor module 176 and the camera module 180. For example, when the resolution of the image corresponding to the object (e.g., the hair 301, the hand 304, or the accessory 305 of FIG. 3) is less than a threshold value, when the object is out of the specified range (e.g., camera's shooting range), or when the object corresponds to the specified portion of the avatar animation, the electronic device 101 may determine that the object satisfies the specified condition. The scheme-based data generation module 423 may include a rule-based generation module (e.g., including various processing circuitry and/or executable program elements) 424, a physically-based generation module (e.g., including various processing circuitry and/or executable program elements) 425, a machine learning-based generation module (e.g., including various processing circuitry and/or executable program elements) 426, and a constraint-based generation module (e.g., including various processing circuitry and/or executable program elements) 427.

According to an embodiment, the rule-based generation module 424 may include various processing circuitry and/or executable program elements and generate the animation data depending on the rule-based animation generation scheme. The rule-based generation module 424 may generate the animation data based on the rule entered in advance. According to an embodiment, the rule-based generation module 424 may enter the rule based, for example, and without limitation, on at least one of the correlation of a plurality of objects, the facial expression of the user, the emotional state of the user, or the like. The rule-based generation module 424 may generate animation data based on transition probabilities for objects and the previously entered rule. An embodiment of a rule-based animation generation scheme will be described in greater detail below with reference to FIGS. 6A, 6B and 6C. According to an embodiment, the rule-based generation module 424 may generate the animation data to which the previously entered rule is applied, by performing key frame interpolation for applying interpolation to the region between key frames or by applying machine learning.

According to an embodiment, the physically-based generation module 425 may include various processing circuitry and/or executable program elements and generate the animation data depending on a physically-based animation generation scheme. The physically-based generation module 425 may calculate the motion for an object through physics simulation. For example, the physically-based generation module 425 may generate animation data for the hair by physically calculating the motion of a hair (e.g., 301 of FIG. 3) of the avatar (e.g., 310 of FIG. 3) depending on the motion of the avatar. The physically-based generation module 425 may combine (or compose) animation data of the object (e.g., a hair) generated by physics simulation and animation data of another object (e.g., the face 302 of FIG. 3). An embodiment of a physically-based animation generation scheme will be described in greater detail below with reference to FIGS. 7A, 7B and 7C. According to an embodiment, the physically-based generation module 425 may generate the animation data to which the physics simulation is applied, by performing key frame interpolation for applying interpolation to the region between key frames or by applying machine learning.

According to an embodiment, the machine learning-based generation module 426 may include various processing circuitry and/or executable program elements and generate the animation data depending on the machine learning-based animation generation scheme. The machine learning-based generation module 426 may generate the animation data for an object based on the learning. According to an embodiment, the machine learning-based generation module 426 may learn the operation for an object based, for example, and without limitation, on at least one of deep learning, self-learning, unsupervised learning, or the like. The machine learning-based generation module 426 may combine animation data, which is generated based on the learning, with animation data of another object. According to an embodiment, the machine learning-based generation module 426 may generate the animation data to which the machine learning is applied, by performing key frame interpolation for applying interpolation to the region between key frames.

According to an embodiment, the constraint-based generation module 427 may include various processing circuitry and/or executable program elements and generate the animation data depending on the constraint-based animation generation scheme. The constraint-based generation module 427 may generate the animation data based on the previously entered constraints. For example, the constraints may include a condition that induces an avatar to move away from the specified region (e.g., obstacles) or a condition that induces an avatar to always pass through another specified region. According to an embodiment, the constraint-based generation module 427 may generate the animation data to which the constraint is applied, by performing key frame interpolation for applying interpolation to the region between key frames or by applying machine learning.

According to an embodiment, the composite module 429 may include various processing circuitry and/or executable program elements and generate avatar animation (e.g., 300 of FIG. 3) based on the animation data generated from the input-based data generation module 412 and the animation data generated from the scheme-based data generation module 423. For example, the composite module 429 may generate the avatar animation indicating a single motion by composing pieces of animation data for a plurality of objects. When the number of frames of the animation data for objects is different, the composite module 429 may adjust the number of frames by performing interpolation. According to an embodiment, the composite module 429 may connect the animation data for objects of different portions, through a motion stitching technology.

According to an embodiment, the display device 160 may include a screen and a display configured to display the avatar animation.

According to an embodiment, the database 430 may store the animation data for a plurality of objects (e.g., first object, second object, . . . ) included in the avatar animation. For example, the animation data for a face (e.g., 302 of FIG. 3) may indicate facial expressions or the motion of the face; the animation data for the body (e.g., 303 of FIG. 3) may indicate at least one motion of an arm, a leg, or a torso; the animation data for a hand (e.g., 304 in FIG. 3) may indicate the motion of the finger or the motion of closing and opening the hand; the animation data for the accessory (e.g., 305 of FIG. 3) may indicate earrings, clothes, or hats. According to an embodiment, the electronic device 101 may update animation data, which is not present in the database 430, from among pieces of animation data generated by the scheme-based data generation module 420 in the database 430.

According to an embodiment, the electronic device 101 may further include a cache memory 435 between the database 430 and the animation generation module 420. The electronic device 101 may store the animation data, which has high usage frequency or has been recently used, in the cache memory 435. The electronic device 101 may improve a hit ratio and generation speed by loading animation data from the cache memory 435.

Figure 5:
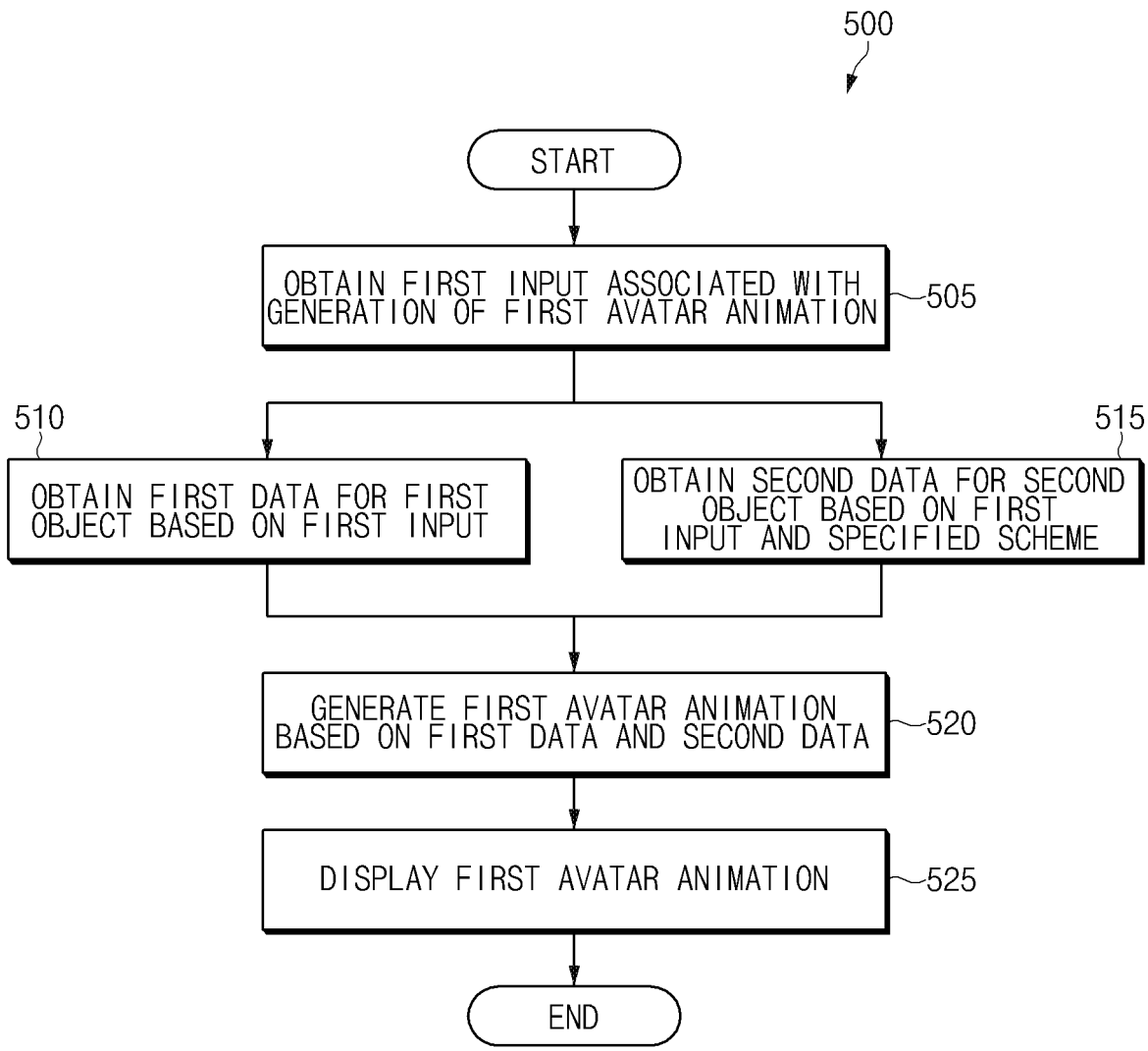
FIG. 5 is a flowchart illustrating an example operation of an electronic device generating avatar animation using a plurality of objects, according to various embodiments.

FIG. 5 is a flowchart 500 illustrating an example operation of the electronic device 101 generating avatar animation using a plurality of objects, according to various embodiments. The operations included in the operation flowchart 500 may, for example, be performed by the electronic device 101 or may be performed by the component (e.g., the processor 120 of FIG. 1 or the animation generation module 420 of FIG. 4) of the electronic device 101.

Referring to FIG. 5, in operation 505, the electronic device 101 may obtain a first input associated with the generation of the first avatar animation (e.g., 300 of FIG. 3). The first avatar animation may include a plurality of objects (e.g., 301, 302, 303, 304, and 305 in FIG. 3). According to an embodiment, the first input may include at least one of an image input or a user input.

In operation 510, the electronic device 101 may obtain first data (which may, for example, be referred to as "first animation data") for a first object among a plurality of objects based on the first input. For example, the electronic device 101 may obtain the first data based on the motion data obtained through at least one sensor.

In operation 515, the electronic device 101 may obtain second data (which may, for example, be referred to as "second animation data") for a second object among a plurality of objects based on the first input and a specified scheme. According to an embodiment, the second object may indicate a location or a portion, which is different from that of the first object. For example, the electronic device 101 may obtain the second data based on at least one of a rule-based animation generation scheme, a physically-based animation generation scheme, a machine learning-based animation generation scheme, or a constraint-based animation generation scheme.

According to an embodiment, the electronic device 101 may perform operation 510 and operation 515 at substantially the same time or may perform operation 510 and operation 515 in order or in reverse order.

According to an embodiment, when there is no motion for the object or when the motion for an object less than a threshold value, the electronic device 101 may reduce the amount of data transmission between components of the electronic device 101 by obtaining the first data or the second data using a key frame. For example, the electronic device 101 may obtain the first data or the second data through the key frame and the frame generated through interpolation.

In operation 520, the electronic device 101 may generate the first avatar animation based on the first data and the second data. For example, the electronic device 101 may compose (e.g., combine) the first data and the second data.

In operation 525, the electronic device 101 may display the first avatar animation through a display (e.g., the display device 160 of FIG. 4).

Figures 6A, 6B, 6C:
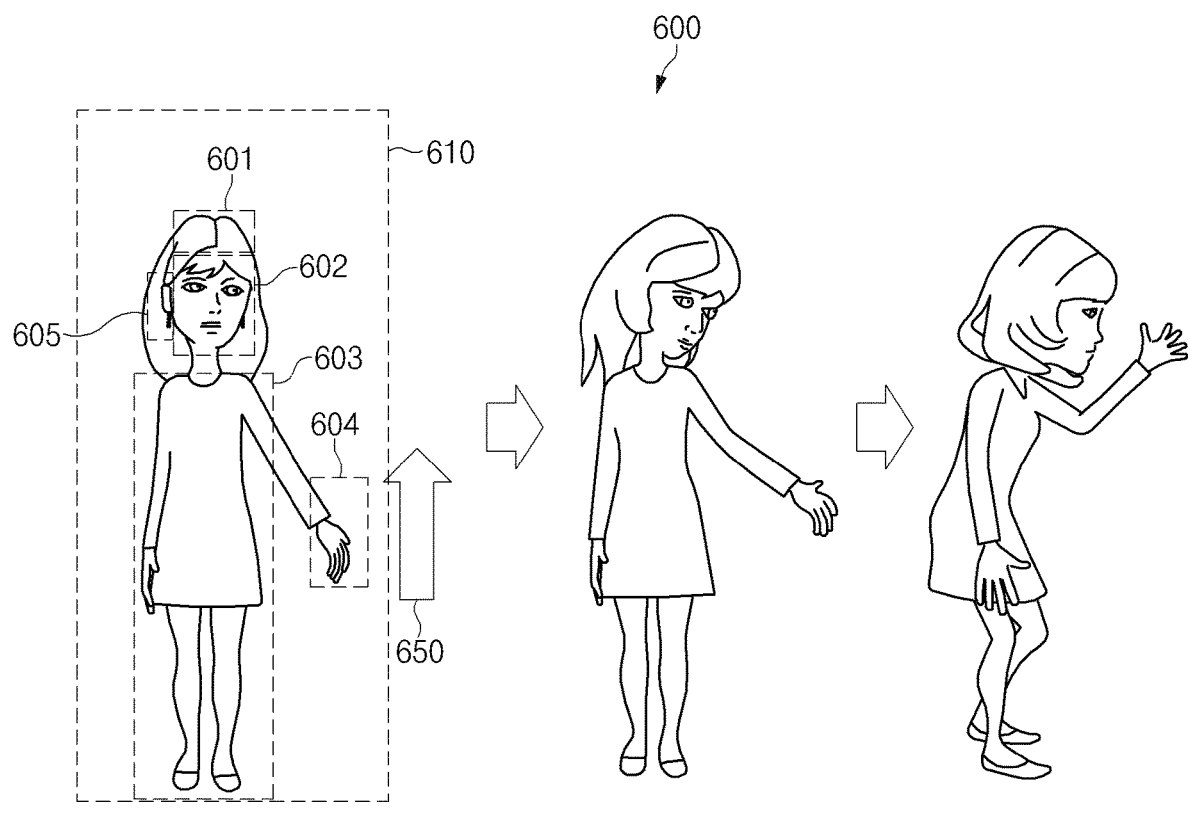
FIGS. 6A, 6B and 6C are diagrams illustrating an example of generating avatar animation based on a specified scheme, according to various embodiments.

FIGS. 6A, 6B and 6C are diagrams illustrating an example of generating avatar animation 600 based on a specified scheme, according to various embodiments.

Referring to FIG. 6, the electronic device 101 may, for example, generate the avatar animation 600 moving in the order of FIG. 6A, FIG. 6B, and FIG. 6C. An avatar 610 may include a plurality of objects (e.g., a hair 601, a face 602, a body 603, a hand 604, and an earring 605). In FIG. 6A, the electronic device 101 may receive a user input 650 to move the hand 604 of the avatar 610 in a specified direction (e.g., upward).

According to an embodiment, the electronic device 101 may generate animation data for the hand 604 moving in the specified direction depending on the user input 650.

According to an embodiment, the electronic device 101 may generate animation data for the face 602 and the body 603 depending on a rule-based animation generation scheme, in response to receiving the user input 650. For example, the electronic device 101 may generate animation data indicating the motion of the face 602 and the body 603 depending on the rule entered such that the face 602 and the body 603 face the direction in which the hand 604 is located, when the hand 604 moves in the specified direction.

According to an embodiment, the electronic device 101 may generate animation data for the hair 601 and an accessory (e.g., the earring 605 or clothing) worn by the avatar 610 based on a physically-based animation generation scheme, in response to receiving the user input 650.

According to an embodiment, the electronic device 101 may generate the avatar animation 600 by composing pieces of animation data for the plurality of objects (e.g., the hair 601, the face 602, the body 603, the hand 604, and the earring 605).

Figures 7A, 7B, 7C:
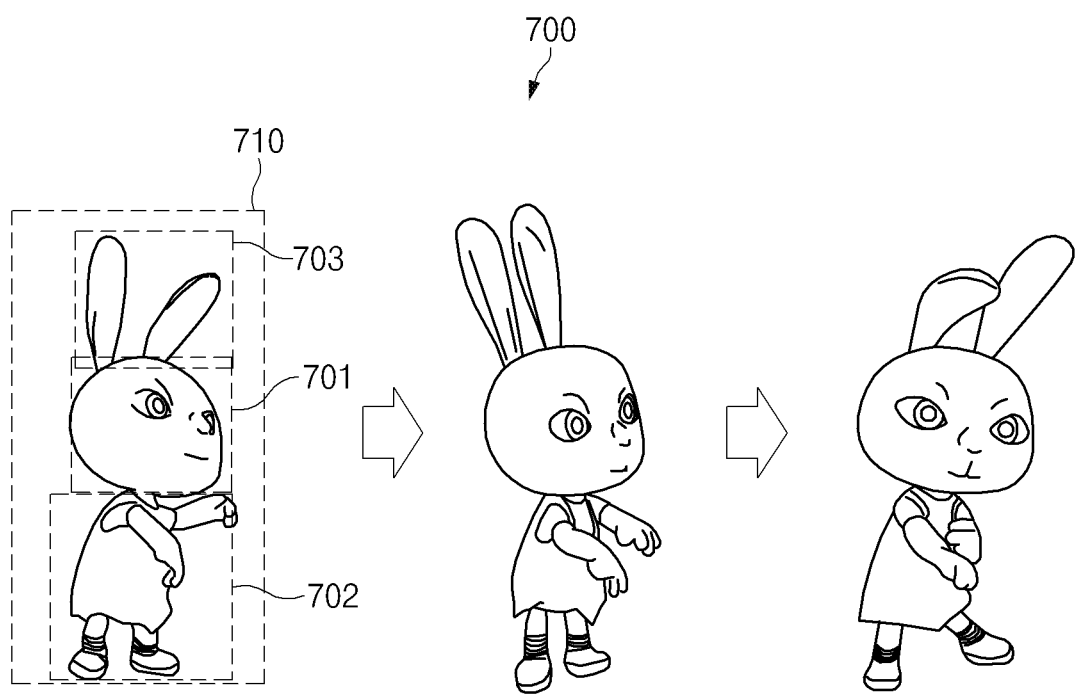
FIGS. 7A, 7B and 7C are diagrams illustrating another example of generating avatar animation based on a specified scheme, according to various embodiments.

FIGS. 7A, 7B and 7C are diagrams illustrating another example of generating avatar animation 700 based on a specified scheme, according to various embodiments.

Referring to FIGS. 7A, 7B and 7C, the electronic device 101 may generate an avatar 710 in the form of an animal (e.g., a rabbit) representing the facial expression and gesture of a user, based on the image input obtained through a camera (e.g., the camera module 180 of FIG. 4). The avatar 710 may include a plurality of objects (e.g., a face 701, a body 702, and ears 703). The electronic device 101 may generate the avatar animation 700 moving in the order of FIG. 7A, FIG. 7B, and FIG. 7C.

According to an embodiment, the electronic device 101 may generate animation data for the face 701 and the body 702 based on the obtained image input.

According to an embodiment, the animation data for the ears 703 may be generated based on a physically-based animation generation scheme. For example, the electronic device 101 may generate animation data indicating the motion of the ears 703 depending on the motion of the face 701 and the body 702 and physics simulation.

According to an embodiment, the electronic device 101 may generate avatar animation 700 by composing animation data for the face 701, animation data for the body 702, and animation data for the ears 703.

Figure 8:
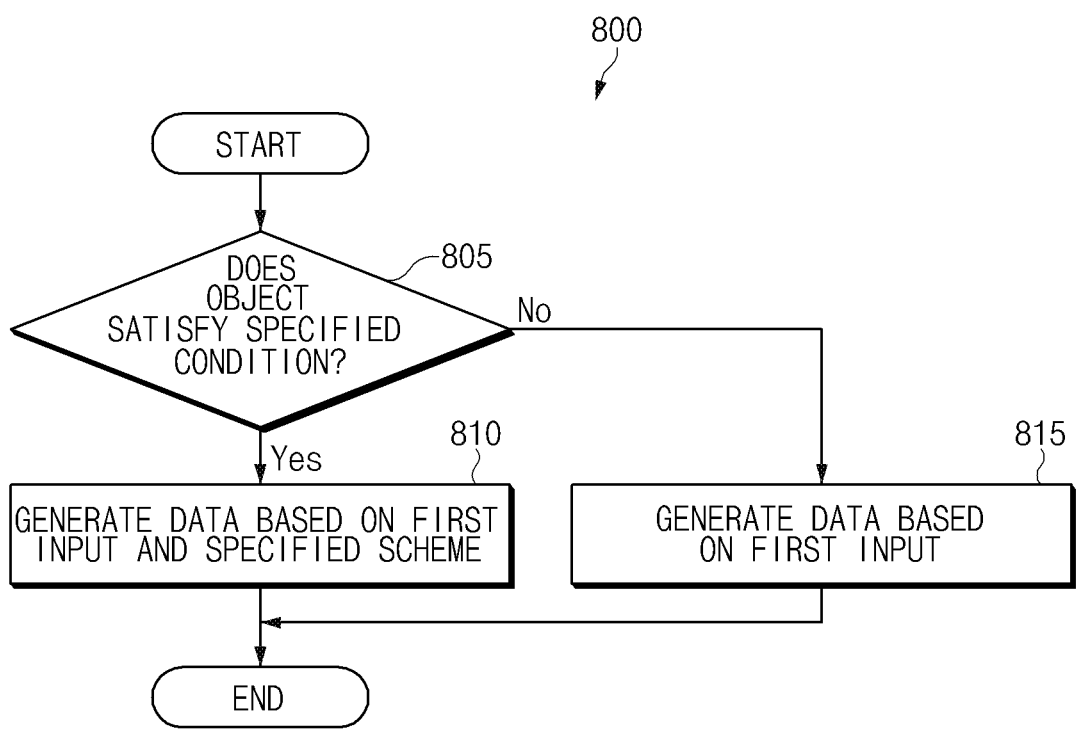
FIG. 8 is a flowchart illustrating an example operation of an electronic device generating data for an object based on a specified condition according to various embodiments.
Figure 9:
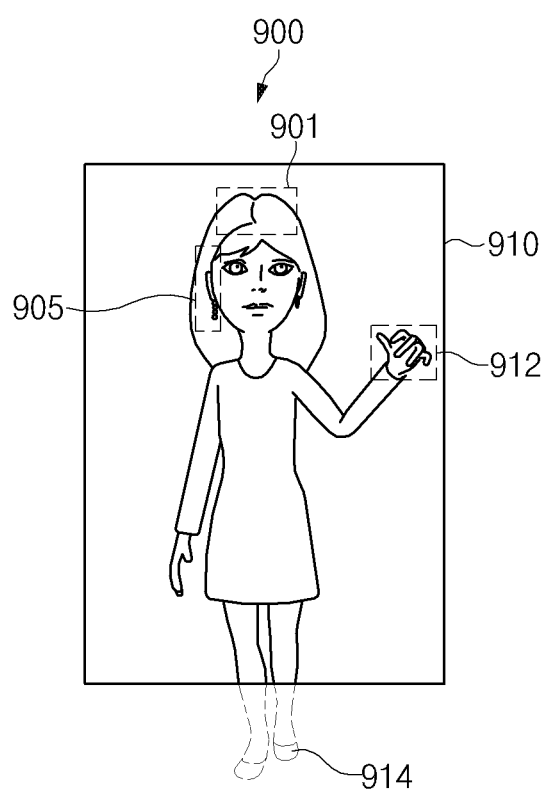
FIG. 9 is a diagram illustrating examples of a specified condition according to various embodiments.

FIGS. 8 and 9 include a flowchart and a diagram illustrating an example operation of the electronic device 101 generating data based on a specified condition, according to various embodiments. FIG. 8 is a flowchart 800 illustrating an example operation of the electronic device 101 generating data based on a specified condition according to various embodiments. FIG. is a diagram illustrating an example operation of the electronic device under a specified condition according to various embodiments. The operations included in the operation flowchart 800 may be an embodiment of operation 510 or operation 515 of FIG. 5. The operations illustrated in the flowchart 800 may be performed by the electronic device 101 or may be performed a component (e.g., the processor 120 of FIG. 1 or the animation generation module 420 of FIG. 4) of the electronic device 101.

Referring to FIG. 8, in operation 805, the electronic device 101 may identify whether an object (e.g., the first object or the second object of FIG. 5) satisfies a specified condition. The object satisfying the specified condition may refer, for example, to an object having the bad quality of the animation data generated by the sensor module 176 and the camera module 180.

For example, referring to FIG. 9, in the image 900 obtained through a camera, because the hand 912 may be small, the resolution (or reliability) of the image for the hand 912 may be low. When the resolution of the image is low, the accuracy of the animation data for the hand 912 may be reduced. Moreover, some body portions of the avatar (e.g., a foot 914) may be out of a shooting range 910 of the camera due to the limited size of the camera. When the foot 914 is out of the shooting range 910 of the camera, the electronic device 101 may not obtain motion data for the foot 914. According to an embodiment, when the resolution of the image corresponding to the object (e.g., the hand 912) is less than a threshold value or when the object (e.g., the foot 914) is out of the shooting range of the camera, the electronic device 101 may determine that the object satisfies the specified condition. For another example, the electronic device 101 may specify objects, on which the tracking is not easily performed, such as an accessory 905, a hair 901, or a hand 912 in advance and may determine that the specified objects satisfy the specified condition.

When the object satisfies the specified condition ("Yes" in operation 805), in operation 810, the electronic device 101 may generate data based on the first input and the specified scheme (e.g., operation 515 of FIG. 5).

When the object does not satisfy the specified condition ("No" in operation 805), in operation 815, the electronic device 101 may generate data based on the first input (e.g., operation 510 of FIG. 5).

Figure 10:
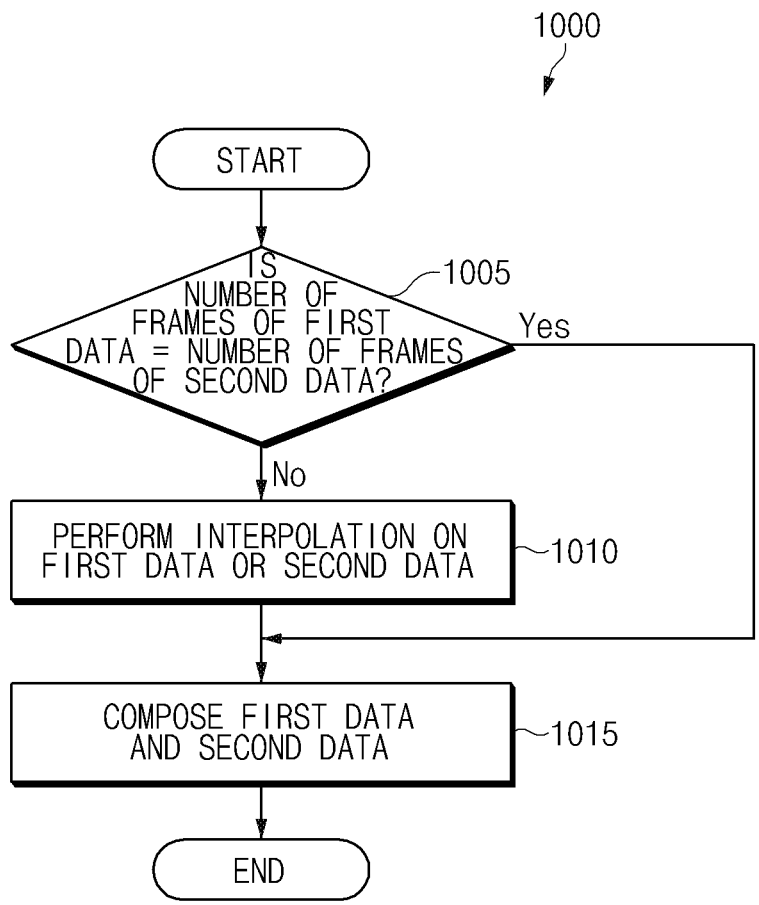
FIG. 10 is a flowchart illustrating an example operation of an electronic device composing data according to various embodiments.

FIG. 10 is a flowchart 1000 illustrating an example operation of the electronic device 101 composing data, according to various embodiments. The operations included in the operation flowchart 1000 may be an embodiment of operation 520 of FIG. 5. The operations illustrated in the operation flowchart 1000 may be performed by the electronic device 101 or may be performed by a component (e.g., the processor 120 of FIG. 1 or the animation generation module 420 of FIG. 4) of the electronic device 101.

Referring to FIG. 10, in operation 1005, the electronic device 101 may identify whether the number of frames of first data is the same as the number of frames of second data. When the number of frames of the first data is the same as the number of frames of the second data ("Yes" in operation 1005), the electronic device 101 may perform operation 1015.

When the number of frames of the first data is not the same as the number of frames of the second data ("No" in operation 1005), in operation 1010, the electronic device 101 may perform interpolation on the first data or the second data. The electronic device 101 may adjust the number of frames of the first data or the second data, through the interpolation. According to an embodiment, the electronic device 101 may perform the interpolation, using a key frame.

In operation 1015, the electronic device 101 may compose the first data and the second data. According to an embodiment, the electronic device 101 may control the body portions of the avatar to connect to each other naturally, by connecting animation data generated depending on different methods through a motion stitching scheme.

Figure 11:
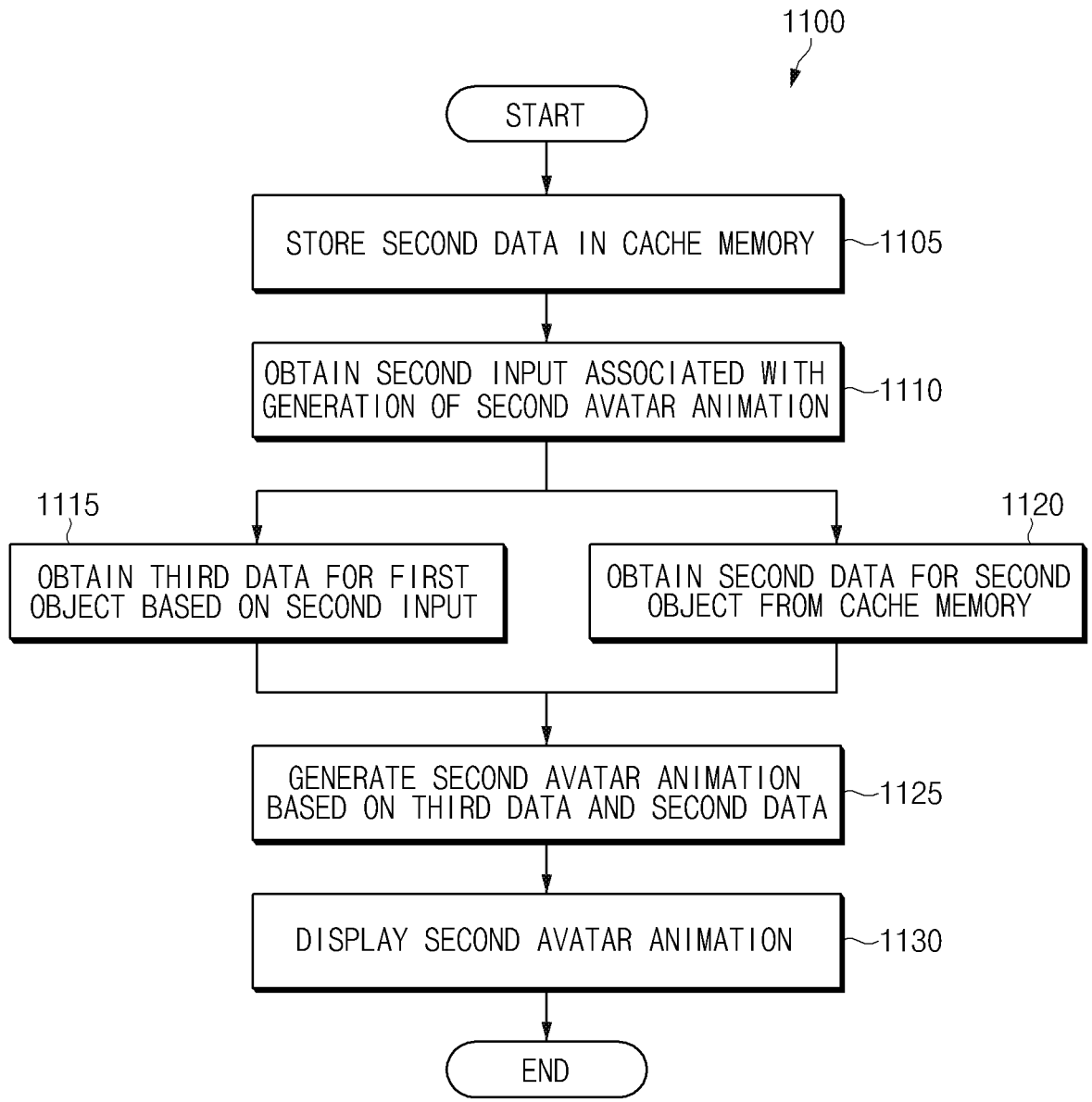
FIG. 11 is a flowchart illustrating an example operation of an electronic device generating avatar animation using a cache memory according to various embodiments.

FIG. 11 is a flowchart 1100 illustrating an example operation of the electronic device 101 generating avatar animation using a cache memory (e.g., 435 of FIG. 4), according to various embodiments. The operations illustrated in the operation flowchart 1100 may be performed by the electronic device 101 or may be performed by the component (e.g., the processor 120 of FIG. 1 or the animation generation module 420 of FIG. 4) of the electronic device 101. FIG. 11 illustrates an embodiment in which the second data of FIG. 5 is stored in a cache memory. However, the same principle may be applied to an embodiment in which the first data of FIG. 5 is stored in a cache memory.

Referring to FIG. 11, in operation 1105, the electronic device 101 may store second data in the cache memory.

In operation 1110, the electronic device 101 may obtain second input associated with the generation of the second avatar animation different from the first avatar animation. For example, the second input may include at least one of an image input or a user input. According to an embodiment, the second avatar animation may include a first object and a second object. The second object may indicate a location or a portion, which is different from that of the first object.

In operation 1115, the electronic device 101 may obtain third data for the first object, based on the second input. For example, the electronic device 101 may obtain the third data based on the motion data obtained through at least one sensor.

In operation 1120, the electronic device 101 may obtain the second data for the second object, from the cache memory. The electronic device 101 may improve a hit ratio and generation speed by loading the second data from the cache memory. According to an embodiment, the electronic device 101 may perform operation 1115 and operation 1120 at substantially the same time or may perform operation 1115 and operation 1120 in order or in reverse order.

In operation 1125, the electronic device 101 may generate the second avatar animation based on the third data and the second data. For example, the electronic device 101 may compose the third data and the second data.

In operation 1130, the electronic device 101 may display the second avatar animation through a display.

As described above, an electronic device (e.g., 101 of FIG. 1) may include a display (e.g., at least part of the display device 160 of FIG. 1), at least one sensor (e.g., the sensor module 176 and the camera module 180 of FIG. 1), a processor (e.g., 120 of FIG. 1) operatively connected to the display and the at least one sensor, and a memory (e.g., 130 of FIG. 1) operatively connected to the processor. The memory may store instructions that, when executed, cause the processor to control the electronic device to: obtain a first input associated with generation of a first avatar animation through the at least one sensor, obtain first data for a first object based on the obtained first input, to obtain second data for a second object based on the obtained first input and a specified scheme, generate the first avatar animation based on the first data and the second data, and display the first avatar animation through the display. The first avatar animation may include a first object and a second object indicating a location different from the first object.

According to an example embodiment, the at least one sensor may include at least one of a touch sensor, a motion sensor, or an image sensor. The instructions, when executed, may cause the processor to control the electronic device to receive at least one of an image input or a user input through the at least one sensor and to obtain motion data for at least one of the first object or the second object from at least one of the image input or the user input.

According to an example embodiment, the specified scheme may include at least one of a rule-based animation generation scheme, a physically-based animation generation scheme, a machine learning-based animation generation scheme, or a constraint-based animation generation scheme.

According to an example embodiment, the instructions, when executed, may cause the processor to control the electronic device to identify whether the first object and the second object satisfy a specified condition, to obtain the first data based on the obtained first input based on the first object not satisfying the specified condition, and to obtain the second data based on the obtained first input and the specified scheme based on the second object satisfying the specified condition.

According to an example embodiment, the instructions, when executed, may cause the processor to control the electronic device to identify that the second object satisfies the specified condition based on a resolution of an image corresponding to the second object being less than a threshold value, based on the second object being out of a specified range, or based on the second object corresponding to a specified portion in the first avatar animation.

According to an example embodiment, the instructions, when executed, may cause the processor to control the electronic device to perform interpolation on the first data or the second data based on the number of frames of the first data not being equal to the number of frames of the second data and to generate the first avatar animation by composing the first data and the second data.

According to an example embodiment, the instructions, when executed, may cause the processor to control the electronic device to generate the first avatar animation by performing motion stitching on the first data and the second data.

According to an example embodiment, the electronic device may further include a cache memory. The instructions, when executed, may cause the processor to control the electronic device to store the second data in the cache memory, to obtain a second input associated with generation of a second avatar animation through the at least one sensor, to obtain third data for the first object based on the obtained second input, to obtain the second data for the second object based on the second data stored in the cache memory, to generate the second avatar animation based on the third data and the second data, and to display the second avatar animation through the display. The second avatar animation may include the first object and the second object.

As described above, a method of an electronic device (e.g., 101 of FIG. 1) may include: obtaining a first input associated with generation of a first avatar animation, obtaining first data for a first object based on the obtained first input, obtaining second data for a second object based on the obtained first input and a specified scheme, generating the first avatar animation based on the first data and the second data, and displaying the first avatar animation through a display. The first avatar animation may include a first object and a second object indicating a location different from the first object.

According to an example embodiment, the obtaining of the first input may include receiving at least one of an image input or a user input and obtaining motion data from at least one of the image input or the user input.

According to an example embodiment, the specified scheme may include at least one of a rule-based animation generation scheme, a physically-based animation generation scheme, a machine learning-based animation generation scheme, or a constraint-based animation generation scheme.

According to an example embodiment, the obtaining of the first data may include identifying whether the first object satisfies a specified condition and obtaining the first data based on the obtained first input based on the first object not satisfying the specified condition. The obtaining of the second data may include identifying whether the second object satisfies the specified condition and obtaining the second data based on the obtained first input and the specified scheme based on the second object satisfying the specified condition.

According to an example embodiment, the identifying of whether the second object satisfies the specified condition may include identifying whether a resolution of an image corresponding to the second object is less than a threshold value, whether the second object is out of a specified range, or whether the second object corresponds to a specified portion in the first avatar animation.

According to an example embodiment, the generating of the first avatar animation may include performing interpolation on the first data or the second data based on the number of frames of the first data not being equal to the number of frames of the second data and generating the first avatar animation by composing the first data and the second data.

According to an example embodiment, the composing of the first data and the second data may include performing motion stitching on the first data and the second data.

As described above, an electronic device (e.g., 101 of FIG. 1) may include a display (e.g., at least part of the display device 160 of FIG. 1), at least one sensor (e.g., the sensor module 176 and the camera module 180 of FIG. 1), a processor (e.g., 120 of FIG. 1) operatively connected to the display and the at least one sensor, and a memory (e.g., 130 of FIG. 1) operatively connected to the processor. The memory may store instructions that, when executed, cause the processor to control the electronic device to obtain a first input associated with generation of a first avatar animation through the at least one sensor, to identify whether a first object included in the first avatar animation satisfies a specified condition, to generate first data for the first object based on the first input based on the first object not satisfying the specified condition or to obtain second data for the object based on the first input and a specified scheme based on the first object satisfying the specified condition, to generate the first avatar animation based on the first data or the second data, and to display the first avatar animation through the display.

According to an example embodiment, the specified scheme may include at least one of a rule-based animation generation scheme, a physically-based animation generation scheme, a machine learning-based animation generation scheme, or a constraint-based animation generation scheme.

According to an example embodiment, the instructions, when executed, may cause the processor to control the electronic device to identify that the first object satisfies the specified condition based on a resolution of an image corresponding to the first object being less than a threshold value, based on the first object being out of a specified range, or based on the first object corresponding to a specified portion in the first avatar animation.

According to an example embodiment, the at least one sensor may include at least one of a touch sensor, a motion sensor, or an image sensor. The instructions, when executed, may cause the processor to control the electronic device to receive at least one of an image input or a user input through the at least one sensor and to obtain motion data for the first object from at least one of the image input or the user input.

According to an example embodiment, the electronic device may further include a cache memory. The instructions, when executed, may cause the processor to control the electronic device to store the second data in the cache memory, to obtain a second input associated with generation of a second avatar animation through the at least one sensor, to identify whether the first object included in the second avatar animation satisfies the specified condition, to obtain third data for the first object based on the second input based on the first object not satisfying the specified condition or to obtain the second data from the cache memory based on the first object satisfying the specified condition, to generate the second avatar animation from the second data or the third data, and to display the second avatar animation through the display.

The electronic device according to various example embodiments disclosed in the disclosure may be various types of devices. The electronic device may include, for example, a portable communication device (e.g., a smartphone), a computer device, a portable multimedia device, a mobile medical appliance, a camera, a wearable device, a home appliance, or the like. The electronic device according to an embodiment of the disclosure should not be limited to the above-mentioned devices.

It should be understood that various example embodiments of the disclosure and terms used in the embodiments do not intend to limit technical features disclosed in the disclosure to the particular embodiment disclosed herein; rather, the disclosure should be understood to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

The term "module" used in the disclosure may include a unit implemented in hardware, software, or firmware or any combination thereof and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 140) including an instruction stored in a machine-readable storage medium (e.g., an internal memory 136 or an external memory 138) readable by a machine (e.g., the electronic device 101). For example, the processor (e.g., the processor 120) of a machine (e.g., the electronic device 101) may call the instruction from the machine-readable storage medium and execute the instructions thus called. The machine may perform at least one function based on the called at least one instruction. The one or more instructions may include a code made by a compiler or a code executable by an interpreter. The machine-readable storage medium may be provided in the form of non-transitory storage medium. Here, the "non-transitory", storage medium is tangible, but may not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

According to various example embodiments disclosed herein, an electronic device may quickly and seamlessly provide avatar animation.

According to various example embodiments disclosed herein, an electronic device may naturally and more precisely display objects regardless of the locations of the objects included in the avatar animation.

While the disclosure has been illustrated and described with reference to various example embodiments thereof, it will be understood by those skilled in the art that various changes in form and details may be made therein without departing from the spirit and scope of the disclosure, including the appended claims and their equivalents.

What is claimed is:
1. An electronic device comprising:
a display;
at least one sensor;
a processor operatively connected to the display and the at least one sensor; and
a memory operatively connected to the processor, wherein the memory is configured to store instructions that, when executed, cause the processor to control the electronic device to:
obtain a first input associated with generation of a first avatar animation through the at least one sensor, wherein the first avatar animation includes a first object and a second object indicating a location different from the first object;
identify whether the first object and the second object satisfy a specified condition;
based on the first object not satisfying the specified condition, obtain first data for the first object based on the obtained first input and without using a specified scheme;
based on the second object satisfying the specified condition, obtain second data for the second object based on the obtained first input and the specified scheme;
generate the first avatar animation based on the first data and the second data; and
display the first avatar animation through the display.
2. The electronic device of claim 1, wherein the at least one sensor includes at least one of a touch sensor, a motion sensor, or an image sensor, wherein the instructions, when executed, cause the processor to control the electronic device to:
receive at least one of an image input or a user input through the at least one sensor; and
obtain motion data for at least one of the first object or the second object from at least one of the image input or the user input.

3. The electronic device of claim 1, wherein the specified scheme includes at least one of a rule-based animation generation scheme, a physically-based animation generation scheme, a machine learning-based animation generation scheme, or a constraint-based animation generation scheme.

4. The electronic device of claim 1, wherein the instructions, when executed, cause the processor to control the electronic device to:
identify that the second object satisfies the specified condition based on a resolution of an image corresponding to the second object being less than a threshold value, based on the second object being out of a specified range, or based on the second object corresponding to a specified portion in the first avatar animation.

5. The electronic device of claim 1, wherein the instructions, when executed, cause the processor to control the electronic device to:
perform interpolation on the first data or the second data based on a number of frames of the first data not being equal to a number of frames of the second data; and
generate the first avatar animation by composing the first data and the second data.

6. The electronic device of claim 5, wherein the instructions, when executed, cause the processor to control the electronic device to:
generate the first avatar animation by performing motion stitching on the first data and the second data.

7. The electronic device of claim 1, further comprising:
a cache memory,
wherein the instructions, when executed, cause the processor to control the electronic device to:
store the second data in the cache memory;
obtain a second input associated with generation of a second avatar animation through the at least one sensor, wherein the second avatar animation includes the first object and the second object;
obtain third data for the first object based on the obtained second input;
obtain the second data for the second object based on the second data stored in the cache memory;
generate the second avatar animation based on the third data and the second data; and
display the second avatar animation through the display.

8. A method of controlling an electronic device, the method comprising:
obtaining a first input associated with generation of a first avatar animation, wherein the first avatar animation includes a first object and a second object indicating a location different from the first object;
identifying whether the first object and the second object satisfy a specified condition;
based on the first object not satisfying the specified condition, obtaining first data for the first object based on the obtained first input and without using a specified scheme;
based on the second object satisfying the specified condition, obtaining second data for the second object based on the obtained first input and the specified scheme;
generating the first avatar animation based on the first data and the second data; and
displaying the first avatar animation through a display.

9. The method of claim 8, wherein the obtaining of the first input includes:
receiving at least one of an image input or a user input; and
obtaining motion data from at least one of the image input or the user input.

10. The method of claim 9, wherein the specified scheme includes at least one of a rule-based animation generation scheme, a physically-based animation generation scheme, a machine learning-based animation generation scheme, or a constraint-based animation generation scheme.

11. The method of claim 8, wherein the identifying of whether the second object satisfies the specified condition includes:
identifying whether a resolution of an image corresponding to the second object is less than a threshold value, whether the second object is out of a specified range, or whether the second object corresponds to a specified portion in the first avatar animation.

12. The method of claim 8, wherein the generating of the first avatar animation includes:
performing interpolation on the first data or the second data based on a number of frames of the first data not being equal to a number of frames of the second data; and
generating the first avatar animation by composing the first data and the second data.

13. The method of claim 12, wherein the composing of the first data and the second data includes:
performing motion stitching on the first data and the second data.

14. An electronic device comprising:
a display;
at least one sensor;
a processor operatively connected to the display and the at least one sensor; and
a memory operatively connected to the processor, wherein the memory is configured to store instructions that, when executed, cause the processor to control the electronic device to:
obtain a first input associated with generation of a first avatar animation through the at least one sensor;
identify whether a first object included in the first avatar animation satisfies a specified condition;
generate first data for the first object based on the first input and without using a specified scheme based on the first object not satisfying the specified condition and obtain second data for the first object based on the first input and the specified scheme based on the first object satisfying the specified condition;
generate the first avatar animation based on the first data or the second data; and
display the first avatar animation through the display.

15. The electronic device of claim 14, wherein the specified scheme includes at least one of a rule-based animation generation scheme, a physically-based animation generation scheme, a machine learning-based animation generation scheme, or a constraint-based animation generation scheme.

16. The electronic device of claim 14, wherein the instructions, when executed, cause the processor to control the electronic device to:
identify that the first object satisfies the specified condition based on a resolution of an image corresponding to the first object being less than a threshold value, based on the first object being out of a specified range, or based on the first object corresponding to a specified portion in the first avatar animation.

17. The electronic device of claim 14, wherein the at least one sensor includes at least one of a touch sensor, a motion sensor, or an image sensor, and
   wherein the instructions, when executed, cause the processor to control the electronic device to:
   receive at least one of an image input or a user input through the at least one sensor; and
   obtain motion data for the first object from at least one of the image input or the user input.

18. The electronic device of claim 14, further comprising:
   a cache memory,
   wherein the instructions, when executed, cause the processor to control the electronic device to:
   store the second data in the cache memory;
   obtain a second input associated with generation of a second avatar animation through the at least one sensor;
   identify whether the first object included in the second avatar animation satisfies the specified condition;
   obtain third data for the first object based on the second input based on the first object not satisfying the specified condition or obtain the second data from the cache memory based on the first object satisfying the specified condition;
   generate the second avatar animation from the second data or the third data; and
   display the second avatar animation through the display.

* * * * *